US010493986B2

(12) United States Patent
Ratcliffe

(10) Patent No.: US 10,493,986 B2
(45) Date of Patent: Dec. 3, 2019

(54) VEHICLE DRIVER ASSIST SYSTEM

(71) Applicant: TRW AUTOMOTIVE U.S. LLC, Livonia, MI (US)

(72) Inventor: Gregory L. Ratcliffe, Taylor, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 47 days.

(21) Appl. No.: 15/536,911

(22) PCT Filed: Jan. 22, 2016

(86) PCT No.: PCT/US2016/014427
§ 371 (c)(1),
(2) Date: Jun. 16, 2017

(87) PCT Pub. No.: WO2016/122969
PCT Pub. Date: Aug. 4, 2016

(65) Prior Publication Data
US 2018/0001890 A1 Jan. 4, 2018

Related U.S. Application Data

(60) Provisional application No. 62/107,580, filed on Jan. 26, 2015.

(51) Int. Cl.
*B60W 30/095* (2012.01)
*B60W 50/14* (2012.01)
(Continued)

(52) U.S. Cl.
CPC ........ *B60W 30/0956* (2013.01); *B60W 30/09* (2013.01); *B60W 30/095* (2013.01);
(Continued)

(58) Field of Classification Search
CPC ........... B60W 30/0956; B60W 30/095; B60W 30/09; B60W 50/14; B60W 2050/0091;
(Continued)

(56) References Cited

U.S. PATENT DOCUMENTS 8,965,687 B2   2/2015  Matsuo et al.
9,221,461 B2  12/2015  Ferguson et al.
(Continued)

FOREIGN PATENT DOCUMENTS

EP            2338733         6/2011

OTHER PUBLICATIONS

PCT/US16/14427 International Search Report and Written Opinion, Completed Mar. 21, 2016.

*Primary Examiner* — Adam R Mott
(74) *Attorney, Agent, or Firm* — Tarolli, Sundheim, Covell & Tummino LLP

(57) ABSTRACT

A vehicle driver assist system includes an expert evaluation system to fuse information acquired from various data sources. The data sources can correspond to conditions associated with the vehicle as a unit as well as external elements. The expert evaluation system monitors and evaluates the information from the data sources according to a set of rules by converting each data value into a metric value, determining a weight for each metric, assigning the determined weight to the metric, and generating a weighted metric corresponding to each data value. The expert evaluation system compares each weighted metric (or a linear combination of metrics) against one or more thresholds. The results from the comparison provide an estimation of a likelihood of one or more traffic features occurring.

17 Claims, 3 Drawing Sheets

(51) Int. Cl.
*B60W 30/09* (2012.01)
*G08G 1/16* (2006.01)
*G06K 9/00* (2006.01)
*G06K 9/62* (2006.01)
*B60W 50/00* (2006.01)
*B60W 10/184* (2012.01)
*B60W 30/18* (2012.01)

(52) U.S. Cl.
CPC ......... *B60W 50/14* (2013.01); *G06K 9/00791* (2013.01); *G06K 9/6289* (2013.01); *G08G 1/16* (2013.01); *B60T 2201/022* (2013.01); *B60W 10/184* (2013.01); *B60W 30/18036* (2013.01); *B60W 2050/0025* (2013.01); *B60W 2050/0051* (2013.01); *B60W 2050/0091* (2013.01); *B60W 2420/42* (2013.01); *B60W 2420/52* (2013.01); *B60W 2550/10* (2013.01); *B60W 2550/12* (2013.01); *B60W 2550/22* (2013.01); *B60W 2550/402* (2013.01)

(58) Field of Classification Search
CPC ....... B60W 30/18036; B60W 2550/10; B60W 2550/402; B60W 2420/52; B60W 2420/42; B60W 2050/0051; B60W 2050/0025; B60W 10/184; B60W 2550/22; B60W 2550/12; G06K 9/6289; G06K 9/00791; G08G 1/16; B60T 2201/022

See application file for complete search history.

(56) References Cited

U.S. PATENT DOCUMENTS

| | | |
|---|---|---|
| 2003/0037594 A1 | 2/2003 | Rendhal et al. |
| 2003/0061864 A1 | 4/2003 | Wong et al. |
| 2003/0149530 A1* | 8/2003 | Stopczynski ......... B60R 21/013 701/301 |
| 2005/0270784 A1* | 12/2005 | Hahn .................... G02B 23/12 362/459 |
| 2009/0037055 A1* | 2/2009 | Danner ............... B60R 21/0134 701/45 |
| 2009/0051516 A1* | 2/2009 | Abel .................... B60W 50/14 340/436 |
| 2009/0319127 A1 | 12/2009 | Ghoneim |
| 2011/0246156 A1 | 10/2011 | Zecha et al. |
| 2014/0012492 A1* | 1/2014 | Bowers ................... G08G 1/16 701/301 |
| 2014/0032093 A1* | 1/2014 | Mills ................... B60W 40/107 701/301 |
| 2015/0170522 A1* | 6/2015 | Noh ................. G08G 1/096741 701/117 |
| 2016/0146616 A1* | 5/2016 | Ren ....................... G01C 21/30 701/409 |

* cited by examiner

VEHICLE DRIVER ASSIST SYSTEM

CROSS REFERENCE TO RELATED APPLICATIONS

This application claims priority to and the benefit of U.S. Provisional Application Serial No. 62/107,580, filed Jan. 26, 2015, entitled VEHICLE DRIVER ASSIST SYSTEM. The above-identified provisional application is incorporated herein by reference in its entirety for all purposes.

BACKGROUND

Vehicle driver assist systems are now being used to provide a vehicle operator with information regarding surrounding environmental conditions and vehicle operation. Such systems often rely on cameras. The driver assist system provides a warning to the vehicle operator if certain conditions exist and maybe even controls certain vehicle functions such as activating the vehicle braking system.

SUMMARY OF THE INVENTION

The present invention is directed to a vehicle driver assist system that fuses multiple sensors with a single expert evaluation arrangement to provide a driver with improved vehicle environmental and operation information.

DETAILED DESCRIPTION

The present invention is directed to a vehicle driver assist system that fuses data from multiple sensors and other data sources and uses an expert evaluation system to provide the vehicle operator with vehicle environmental and operations information. The driver assist system analyzes the data in an expert evaluation system, determines the likelihood of a traffic feature, and provides a warning or recommends and/or automatically implements a safety response.

Figure 1:
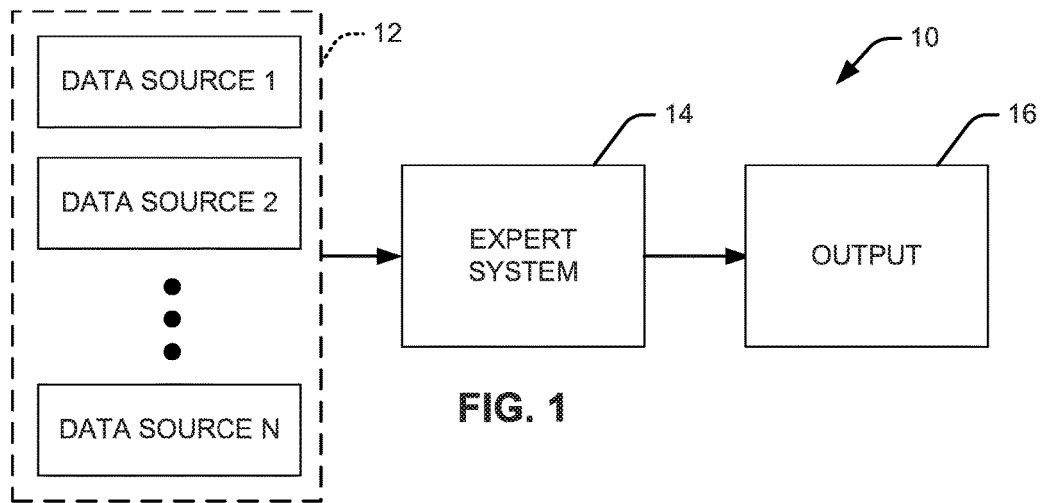
FIG. 1 is a functional block diagram illustrating an expert evaluation system in accordance with an example of the present invention.

FIG. 1 illustrates a functional block diagram of a vehicle driver assist system 10 employing an expert evaluation system 14 in accordance with the present invention. In the illustrated example, the expert evaluation system 14 can utilize a rule based expert system, although it will be appreciated that the expert evaluation system could utilize a statistical classifier, an artificial neural network, a support vector machine, or any other appropriate system for classifying inputs from a plurality of data sources into one of a plurality of classes. The driver assist system 10 fuses information acquired from various data sources 12. The data sources 12 can correspond to sensors or databases for detecting or referencing conditions or attributes associated with the vehicle as a unit (e.g., speed of travel, location, distance from a known point, etc.) as well as external elements (e.g., weather, local traffic laws, presence of obstacles, relative location of other vehicles, etc.). The expert evaluation system 14 monitors and evaluates the information from the data sources 12 according to a set of rules by converting each data value into a metric value, determining a weight for each metric, assigning the determined weight to the metric, and generating a weighted metric corresponding to each data value. The expert evaluation system 14 compares each weighted metric (or a linear combination of metrics) against one or more thresholds. The results from the comparison provide an estimation of a likelihood of one or more traffic features occurring.

A traffic feature can be any variety of circumstances and/or obstacles that would affect the vehicle's course or potential safety. Non-limiting examples of a traffic feature are: other vehicles on a roadway (e.g., other vehicles in traffic, up to and including a collision); weather conditions (e.g., determined from a weather forecasting service, and/or by a local sensor); and natural and/or man-made obstacles, be they fixed or transient. In determining whether a traffic feature exists, data from each sensor and/or data source (e.g., from a networked database, operator input, etc.) is analyzed and processed by the expert system to generate one or more metrics. Data input could itself be assigned a confidence value based on a range of possible values from the particular sensor or data source. The level of the confidence value would in turn affect the metric upon which a determination of a traffic feature would be based.

Based on the threshold level achieved by application of the selected weighted metric or metrics, a confidence level is assigned to the estimation. When the estimated confidence for the occurrence of the traffic feature is of a sufficient level, the system provides an output 16. For example, if a low level threshold is met, the output 16 can be a warning to the vehicle operator of the upcoming traffic feature. If a higher level threshold is met, the output 16 can automatically implement an autonomous vehicle operational modification to respond to the traffic feature. If no threshold level is met, the expert evaluation system 14 neither provides a warning nor performs an autonomous vehicle operational modification but, instead, continues to monitor inputs from the data source(s) 12. In this manner, the system ensures an appropriate response for each determined traffic feature.

Figure 2:
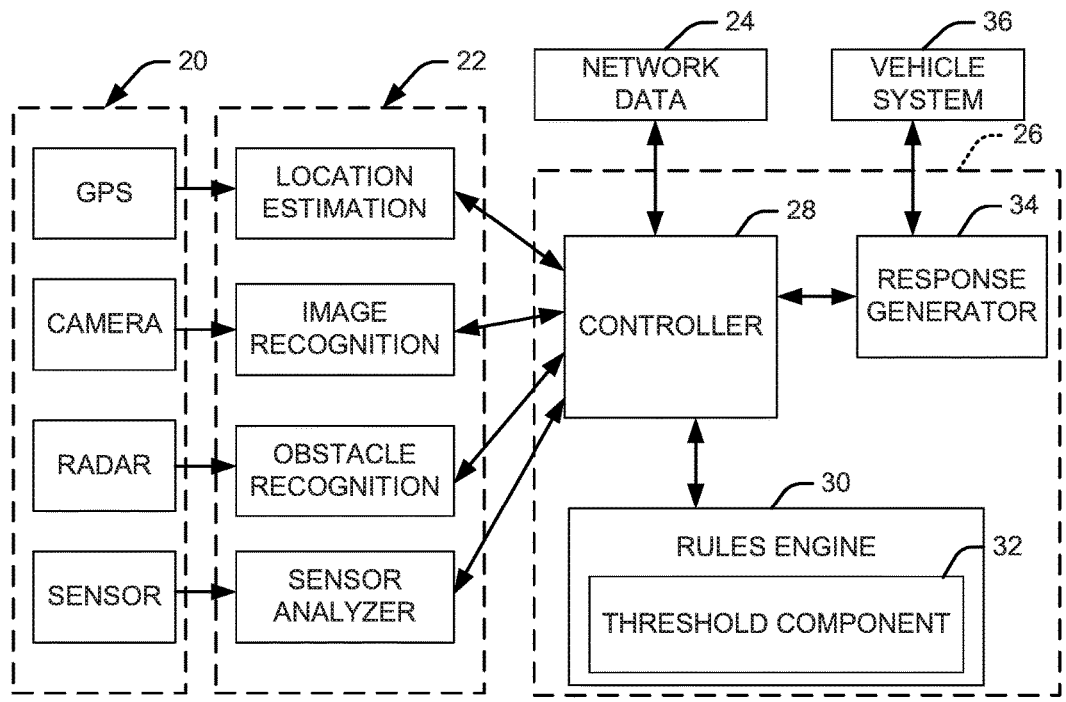
FIG. 2 is another functional block diagram illustrating an expert evaluation system in accordance with an example of the present invention.

FIG. 2 is another functional block diagram illustrating a vehicle driver assist system employing an expert system 26 in accordance with the present invention in which information obtained from a plurality of sensors 20 is fused to generate a response. In accordance with one example, the plurality of sensors 20 include, for example, a GPS system, a vehicle mounted camera (e.g., a forward looking camera), a radar detector, a vehicle stability system, and/or additional sensors that can collect data useful in ascertaining surrounding vehicle environmental conditions (e.g., vehicle speed, tire pressure, temperature, road surface conditions, etc.). The information from the sensors 20 is communicated to associated signal processing components 22 configured to analyze the output data from each sensor. For example, the GPS is connected to a location estimation component, along with mapping data can indicate the vehicle is operating in an urban environment and provide data identifying a particular street location estimate of the vehicle. The camera and image recognition component can determine the vehicle is on an improved roadway. The radar and obstacle recognition component can identify a barrier on the road ahead. Additional sensors can identify the outside air temperature, tire pressure at each time, a road condition, etc. Information from the additional sensors is analyzed by an appropriate software, hardware (i.e. circuit) or signal processing component 22.

The results of the signal processing component 22 analysis are provided to the expert evaluation system 26. The expert evaluation system 26 can include a controller 28 to store and execute machine readable instructions, e.g., a computing device. The expert evaluation system 26 can identify the type of data (e.g., GPS location data, camera image data, etc.) received from the signal processing component 22, and build an overall picture of the environment surrounding the vehicle and current driving conditions. Moreover, network data 24 can be provided to the controller 28. For example, network data 24 can include data from one or more databases containing information relevant to vehicle operation (e.g., map data, weather conditions, traffic information, etc.), as well as data from nearby vehicles outfitted with devices capable of vehicle-to-vehicle communication.

In one example, the expert evaluation system 26 can convert the data from the signal processing component 22 into standardized metrics for further data analysis. A metric can be considered as a block of "evidence" toward a decision threshold associated with a given traffic condition. The expert evaluation system 26 standardizes the data across the systems so that the metrics can be applied against the decision thresholds in a uniform manner. The conversion is processed by a rules based engine 30 that analyzes and processes the incoming data. Each metric can be a function of a confidence in its corresponding data, either from the processing or an analysis at the expert evaluation system 26. In one implementation, a confidence in a given data stream can be estimated according to a measure of deviation (e.g., standard deviation, interquartile range, etc.) extracted from a most recent set of samples.

For example, the image recognition component may provide data indicating a high level of confidence that an object has been captured by the camera, which according to the rules, will result in a larger metric assigned to the image data. Further, the rules engine 30 will determine a weight for the camera data and assign the weighting to the metric associated with the camera data. The rules may rank the relative importance of a given sensor input based on a variety of factors, including the reliability of the respective data source and associated environmental contributors. Although a default, predetermined weight can be established, the weight assigned to a given data point may depend on one or more factors, such as the source of the data, information related to other data, as well as the type of traffic feature. For example, in evaluating whether an obstruction is in the roadway, radar may be given a greater weight than map or GPS data. Conversely, if a rain sensor or a weather service indicates heavy precipitation, radar sensitivity may be diminished, resulting in radar data being assigned a lesser weight. Similarly, in darkness, an optical system operating in the visible spectrum may be less heavily weighted when compiling metrics.

In a situation where a sensor is determined to be experiencing a malfunction or providing consistently unreliable data, the expert system may remove the incoming data from the compiled metrics altogether, for example, by assigning a zero weight to that metric. Such a modification may require additional calibration and/or service from the system itself or an outside source (e.g., maintenance personnel) to address the issue. Accordingly, the weighting of data is dynamically determined, able to change with environmental conditions based on the one or more rules. Advantageously, the data from each sensor can be analyzed independently and/or in the aggregate to generate metrics for the expert system. Thus, in the example of an obstruction in the roadway, radar data alone may be sufficient to invoke a response from the vehicle system (e.g., an alarm or automatic braking), without a need for considering the camera. Thus, the weighted metric value corresponding to the camera data is compared against one or more predetermined thresholds in a threshold component 32. If the weighted metric value meets one or more threshold values, the threshold component 32 informs the controller 28 that a response is warranted, and at which level. A response generator 34 then generates an appropriate response based on a specific threshold value. Based on the thresholds, an estimation is made as to the likelihood of a traffic feature for driving condition requiring a response.

In one example, the confidence value can correspond to a first threshold to invoke a first response, and a second threshold to invoke a second response. More specifically, the first threshold can be lower than the second threshold, such that a smaller metric is needed to invoke the corresponding response. Additional thresholds and responses can also be employed. For example, meeting the lowest threshold may invoke a simple alert, such as a dashboard light or single, audible alert. Further, one or more intermediate thresholds may be applied before meeting the highest threshold. For example, the alert can become more noticeable, such as the dashboard light flashing, the audible alert repeating, and/or increasing in frequency or volume as additional thresholds are reached. At the highest threshold, one or more safety features can be implemented (e.g., automatic breaking).

It will be further appreciated that the thresholds can be dynamic according to an immediacy of the traffic feature. For example, as the proximity of the traffic feature increases the thresholds for action to be taken can be lessened. As the vehicle system determines that contact with the traffic feature is imminent, the thresholds can be lowered still further. Vehicle systems that instruct this determination can include the tachometer, tire pressure sensors, seat belt sensors and other safety system feedback, and other relevant sensor data. Such data can be useful in determining the values for the dynamic thresholds, based on, for example, calculated breaking time and/or stopping distance.

The system can assign a high level of confidence to the determination that a traffic feature exists when the presence of the traffic feature is confirmed by additional sensors or systems. To this end, for example, the metric provided by the camera or radar can be combined with metrics assigned to a traffic report received from a networked reporting system or other relevant metric. The thresholds can then be compared to the sum of these weighted metrics, with the response of the vehicle determined according to the threshold achieved. For example, an audible and/or visual warning can be presented to the vehicle driver, or an autonomous vehicle response can be implemented (e.g., automatic breaking) in accordance with the generated response. If, however, the system determines that the confidence level of the determined condition is low, the system will continue to monitor the inputs 22 and perform evaluations in the expert system 26. In this example, if networked data (e.g., from a traffic service or information gained from nearby vehicles) suggests an obstruction is in the roadway ahead but not an immediate concern, the first response can be an alert to the vehicle driver. However, if the expert system determines that a collision with the obstruction is imminent based on networked data coupled with radar data, a greater confidence may be generated and the second threshold may invoke a different response, such as automatic breaking.

In another example implementation of the vehicle driver assist system described herein, the traffic feature can be a barrier located in the roadway ahead of the vehicle. The radar and forward looking camera have identified the obstacle and have provided data to the expert system to that effect. However, the GPS system, map, and networked data have not provided positive data identifying the barrier. In this example, each data source is at full functionality, and the expert system applies the default weight to each. Although the GPS system, map, and networked data do not confirm the presence of the barrier, the metrics derived from the radar and camera data may be sufficient to invoke a response in accordance with one or more thresholds, as described above, particularly with reduction of the one or more thresholds as the barrier is approached.

In yet another example, the weights associated with the various metrics can be altered when the vehicle enters a tunnel. In this instance, local systems are operating properly, and could return positive data that identifies an obstruction. However, once within the tunnel, the GPS data feed becomes inconsistent and/or fails altogether. Thus, the system can determine that the GPS data is unreliable and should not be considered, and either lower the weighting of the GPS data or setting it to a null value. In this scenario, the weight applied to local systems, such as a vehicle mounted camera or tire pressure sensor, may be increased or the thresholds for one or more responses may be lowered to compensate for the loss of a data source. In another example, the system may recognize in advance the upcoming tunnel (e.g., from GPS and/or map data). The system may then proactively modify the weighting to one or more systems with the anticipation that a data source will have limited accuracy or be unavailable.

In the example of the determined barrier in the roadway, if a single vehicle sent a report of a barrier over the network 24 yet did not slow down or modify course, and other vehicles similarly failed to modify their route, the centrally located traffic monitoring/analysis location module could decide that the barrier was not an obstacle requiring attention, from the autonomous system, the authorities, etc. Even as the system determines that autonomous control is warranted, a visual, audible or haptic alert is provided to the driver as well.

Furthermore, if various vehicles confirmed the presence of a barrier in the roadway over the network 24 and every such vehicle's associated expert system identified a change in driver behavior in response to the barrier (e.g., stopped vehicles and/or lane changes), the centrally located traffic monitoring/analysis location module can forward that information to other nearby vehicles. Alternatively, the one vehicle could transmit the analyzed date directly to other nearby vehicles. With such an arrangement, one of the additional sensors in the plurality of sensors 20 would include a receiver for receiving traffic condition data from either other vehicles directly and/or from a central monitoring station. Additionally, if a traffic feature is identified, the information can be uploaded to remote networked applications through network data 24. For example, centrally located traffic monitoring/analysis location modules that compile traffic and environmental information for a particular geographic area can use the data from individual vehicles to make determinations of road conditions and possible traffic issues and, in turn, make available that information to other vehicles in the area. A similar application can include the identification of emergency vehicles, where the emergency vehicle itself can submit a location and direction signal, or vehicles nearby can inform the expert system of the approaching vehicle and provide the operator with appropriate notification/actions required.

As mentioned above, traffic data and information can be provided to the system, either as stored in GPS location information or in a memory storage device within the system. For example, traffic speed limit data can be provided and/or stored in memory such that the system can recommend or automatically modify behavior (e.g., while driving in a school zone during a restricted time of day). The information can also be used when physical conditions make recognition of road conditions or traffic postings difficult (e.g., a speed sign knocked over or a snow covered road). The information can inform the system of upcoming turns, traffic patterns, and construction based on the GPS stored data and react accordingly.

Another example is that the camera system may be monitoring vehicle road signs for posted vehicle speeds, upcoming turns in the road, etc. Since such road signs may be obscured for a variety of reasons (e.g., snow cover, damage), the expert system could have stored information regarding posted speed limits for the particular vehicle location. If the system determines that the camera data is unreliable, such as from inconsistent inputs or from weather reports, the GPS information could be assigned a higher weighted value than the camera information.

Figure 3:
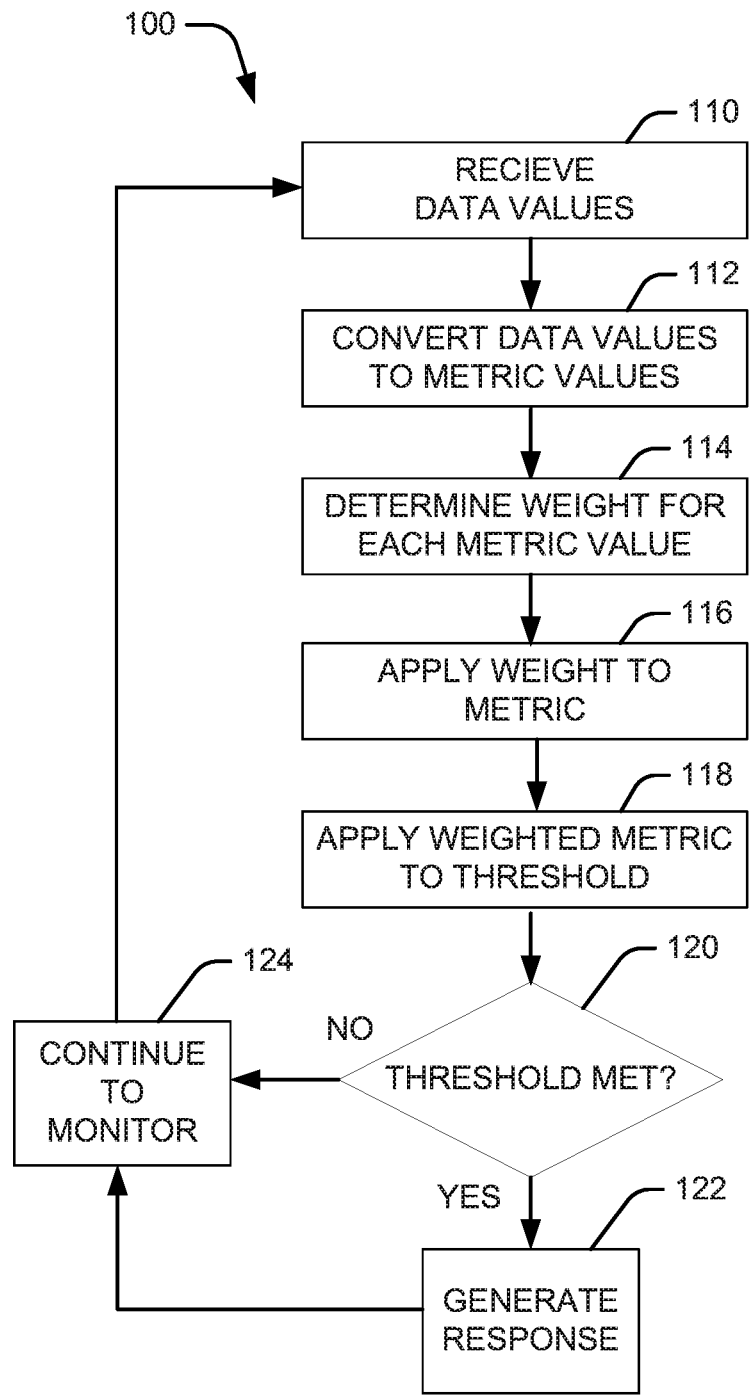
FIG. 3 illustrates a method for employing the expert evaluation system in accordance with an example of the present invention.

FIG. 3 illustrates a flow diagram of a vehicle driver assist system 100 employing the expert evaluation system as provided in FIGS. 1 and 2. In accordance with the example of FIG. 3, the driver assist system 100 receives data values from various data sources at 110. In 112, the expert evaluation system monitors and evaluates the information from the data sources according to a set of rules by converting each data value into a metric value. In 114, a weight for each metric is determined, and in 116 the determined weight is applied to the metric, and generating a weighted metric corresponding to each data value. In 118, the expert evaluation system compares each weighted metric (or a linear combination of metrics) against one or more thresholds. In 120, it is determined whether one or more of the thresholds has been met. If a threshold has been met, the confidence for the occurrence of the traffic feature is of a sufficient level, the system generates a response in 122. If no threshold level is met, in 124 the expert evaluation system continues to monitor inputs from the data source(s).

Figure 4:
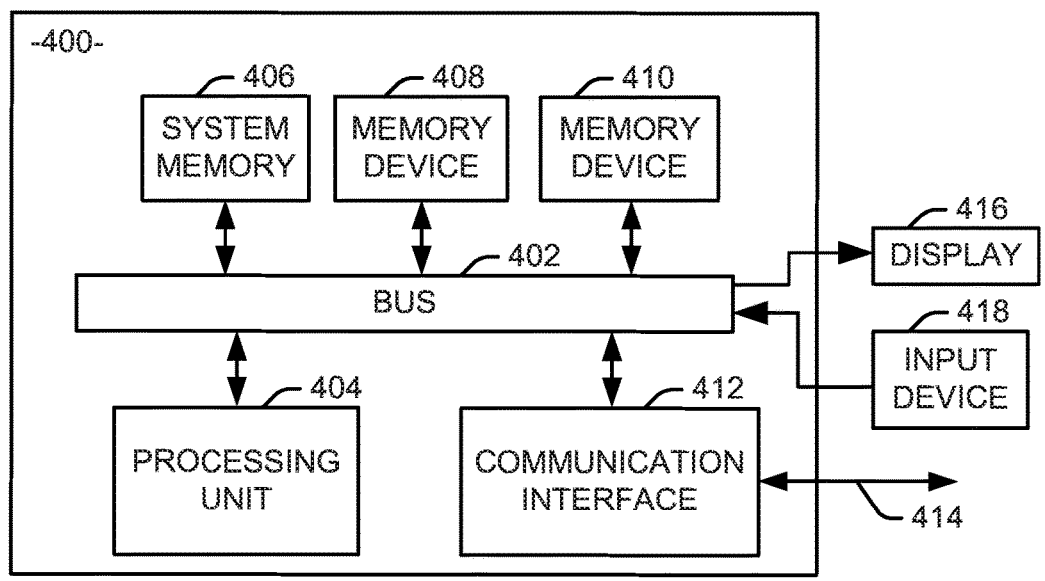
FIG. 4 is a schematic block diagram illustrating an exemplary system of hardware components capable of implementing examples of the systems and methods disclosed in FIGS. 1-3.

FIG. 4 is a schematic block diagram illustrating an exemplary system 400 of hardware components capable of implementing examples of the present invention disclosed in FIGS. 1-4, such as the expert system illustrated in FIG. 1. The system 400 can include various systems and subsystems. The system 400 can be, for example, a personal computer, a laptop computer, a tablet computer, a smart portable device, a workstation, a computer system, an appliance, an application-specific integrated circuit (ASIC), a server, a server blade center, a server farm, or a similar device.

The system 400 can include a system bus 402, a processing unit 404, a system memory 406, memory devices 408 and 410, a communication interface 412 (e.g., a network interface), a communication link 414, a display 416 (e.g., a video screen), and an input device 418 (e.g., a keyboard and/or a mouse). The system bus 402 can be in communication with the processing unit 404 and the system memory 406. The additional memory devices 408 and 410, such as a hard disk drive, server, stand alone database, or other non-volatile memory, can also be in communication with the system bus 402. The system bus 402 interconnects the processing unit 404, the memory devices 406-410, the communication interface 412, the display 416, and the input device 418. In some examples, the system bus 402 also interconnects an additional port (not shown), such as a universal serial bus (USB) port. The processing unit 404 can be a computing device and can include an application-specific integrated circuit (ASIC). The processing unit 404 executes a set of instructions to implement the operations of examples disclosed herein. The processing unit 404 can include a processing core.

The additional memory devices 406, 408 and 410 can store data, programs, instructions, database queries in text or compiled form, and any other information that can be needed to operate a computer. The memories 406, 408 and 410 can be implemented as non-transitory computer-readable media (integrated or removable) such as a memory card, disk drive, compact disk (CD), or server accessible over a network. In certain examples, the memories 406, 408 and 410 can store text, images, video, and/or audio, along with appropriate instructions to make the stored data available at an associated display 416 in a human comprehensible form. Additionally, the memory devices 408 and 410 can serve as databases or data storage for the system illustrated in FIG. 1. Additionally or alternatively, the system 400 can access an external data source through the communication interface 412, which can communicate with the system bus 402 and the communication link 414.

In operation, the system 400 can be used to implement a control system for an interactive overlay system that governs the interaction between the supervisor and user. Computer executable logic for implementing the interactive overlay system resides on one or more of the system memory 406 and the memory devices 408, 410 in accordance with certain examples. The processing unit 404 executes one or more computer executable instructions originating from the system memory 406 and the memory devices 408 and 410. The term "computer readable medium" as used herein refers to a medium that participates in providing instructions to the processing unit 404 for execution, and can include multiple physical memory components linked to the processor via appropriate data connections.

From this description of the invention, one of ordinary skill in the art will appreciate that other modifications, combinations, and permutations are possible. The present invention is intended to embrace all such modifications, combinations and permutations that fall within the scope of the appended claims.

Furthermore, relative terms used to describe the structural features of the figures illustrated herein, such as above and below, up and down, first and second, near and far, etc., are in no way limiting to conceivable implementations. For instance, where examples of the structure described herein are described in terms consistent with the figures being described, and actual structures can be viewed from a different perspective, such that above and below may be inverted, e.g., below and above, or placed on a side, e.g., left and right, etc. Such alternatives are fully embraced and explained by the figures and description provided herein.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for implementing a vehicle decision making system on a computer readable medium configured to execute machine readable instructions on a processor, the method comprising:
    collecting data from a plurality of sensors;
    analyzing the data by a plurality of analysis components;
    converting the analyzed data from the plurality of analysis components to produce respective standardized metrics at an expert evaluation system;
    assigning weights to each standardized metric at the expert evaluation system;
    comparing a sum of the weighted metrics to at least one threshold to estimate a likelihood of the occurrence of a traffic feature, the at least one threshold comprising a first threshold and a second threshold greater than the first threshold, wherein each of the first and second thresholds are reduced as a proximity of the traffic feature to the vehicle increases; and
    generating a response at a vehicle associated with the vehicle decision making system based on the estimated likelihood of the occurrence of the traffic feature, the response comprising invoking one of a first response if the estimated likelihood meets the first threshold but fails to meet the second threshold or a second response if the estimated likelihood meets the second threshold.

2. The method of claim 1, where each standardized metric is associated with one of the plurality of sensors, and the weight for the standardized metric is assigned according to input from another one of the plurality of sensors.

3. The method of claim 1, wherein generating the response at the vehicle comprises providing an alert to a driver of the vehicle.

4. The method of claim 1, wherein generating the response at the vehicle comprises activating a safety system of the vehicle.

5. The method of claim 1, wherein the traffic feature is one of another vehicle on a roadway, a weather condition, and an obstacle in the roadway.

6. The method of claim 1, further comprising monitoring the plurality of sensors to determine when a given sensor may have limited accuracy, wherein assigning the weights to each standardized metric comprising assigning the weights according to the reduced accuracy of the given sensor.

7. The method of claim 6, wherein the given sensor is a camera and monitoring the plurality of sensors comprises determining that a weather condition is present that might obscure a field of view of the camera.

8. The method of claim 6, wherein the given sensor is a global positioning system (GPS) receiver and monitoring the plurality of sensors comprises determining that the vehicle is about to enter a tunnel.

9. A vehicle decision making system comprising:
    a plurality of sensors to collect data;
    an expert evaluation system configured to:
    convert the collected data from a subset of the plurality of sensors into respective metrics;
    determine a weight for each metric;
    compare a linear combination of the metrics, using the determined weights, to at least one threshold to estimate a likelihood of the occurrence of a traffic feature, the at least one threshold comprising a first threshold and a second threshold greater than the first threshold, wherein each of the first and second thresholds are reduced as a proximity of the traffic feature to the vehicle increases; and generate a response at a vehicle associated with the vehicle decision making system from the comparison of the linear combination to the threshold, the response comprising invoking one of a first response if the estimated likelihood meets the first threshold but fails to meet the second threshold or a second response if the estimated likelihood meets the second threshold.

10. The vehicle decision making system of claim 9, wherein the plurality of sensors includes a receiver for receiving traffic condition data from one of another vehicles and a central monitoring station.

11. The vehicle decision making system of claim 10, wherein the plurality of sensors further includes at least one of a global positioning system (GPS) receiver, a vehicle mounted camera, a radar, and a vehicle stability system.

12. The vehicle decision making system of claim 9, wherein the at least one threshold comprises a first threshold and a second threshold greater than the first threshold, and wherein the expert evaluation system generates the response for the safety feature by invoking one of a first response if the linear combination meets the first threshold but fails to meet the second threshold or a second response if the linear combination meets the second threshold.

13. The vehicle decision making system of claim 9, wherein the expert evaluation system is configured to determine that one of the plurality of sensors will have limited accuracy and modify the weight for the metric associated with the one of the plurality of sensors.

14. A method for implementing a vehicle decision making system on a computer readable medium configured to execute machine readable instructions on a processor, the method comprising:

collecting data from a plurality of sensors;

analyzing the data by a plurality of analysis components;

converting the analyzed data from the plurality of analysis components to produce respective standardized metrics at an expert evaluation system;

assigning weights to each standardized metric at the expert evaluation system;

comparing a sum of the weighted metrics to a first threshold and a second threshold greater than the first threshold to estimate a likelihood of the occurrence of a traffic feature, wherein each of the first and second thresholds are reduced as a proximity of the traffic feature to the vehicle increases; and generating one of a first response at a vehicle associated with the vehicle decision if the estimated likelihood meets the first threshold but fails to meet the second threshold or a second response if the estimated likelihood meets the second threshold.

15. The method of claim 14, wherein the first response comprises providing an alert to a driver of the vehicle and the second response comprises activating a safety system of the vehicle.

16. The method of claim 14, further comprising monitoring the plurality of sensors to determine when a given sensor may have limited accuracy, wherein assigning the weights to each standardized metric comprising assigning the weights according to the reduced accuracy of the given sensor.

17. The method of claim 14, wherein the plurality of sensors includes each of a receiver for receiving traffic condition data from one of another vehicles and a central monitoring station, a global positioning system (GPS) receiver, a vehicle mounted camera, a radar, and a vehicle stability system.

* * * * *